United States Patent [19]

Zickwolf, Jr.

[11] Patent Number: 5,042,245

[45] Date of Patent: Aug. 27, 1991

[54] METHOD AND SYSTEM FOR CONTROLLING VARIABLE COMPRESSOR GEOMETRY

[75] Inventor: Herbert C. Zickwolf, Jr., Bozrah, Conn.

[73] Assignee: United Technologies Corporation, Hartford, Conn.

[21] Appl. No.: 424,295

[22] PCT Filed: Feb. 27, 1989

[86] PCT. No.: PCT/US89/00833
§ 371 Date: Feb. 27, 1989
§ 102(e) Date: Feb. 27, 1989

[87] PCT Pub. No.: WO90/10148
PCT Pub. Date: Sep. 7, 1990

[51] Int. Cl.⁵ .............................. F02C 9/16
[52] U.S. Cl. ................... 60/39.03; 60/39.29
[58] Field of Search ........... 60/39.03, 39.27, 39.29; 415/27, 48, 49

[56] References Cited

U.S. PATENT DOCUMENTS

| | | | |
|---|---|---|---|
| 3,092,128 | 6/1963 | Pembleton | 60/39.29 |
| 3,795,104 | 3/1974 | McLean | 60/39.27 |
| 3,937,588 | 2/1976 | Kisslar | 415/17 |
| 4,060,980 | 12/1977 | Elsaesser et al. | 60/39.29 |
| 4,164,035 | 8/1979 | Glennon et al. | 60/39.29 |
| 4,279,568 | 7/1981 | Munroe | 415/17 |
| 4,594,849 | 6/1986 | Kenison et al. | 60/39.29 |
| 4,709,546 | 12/1987 | Weiler | 60/39.29 |
| 4,755,104 | 7/1988 | Castro et al. | 415/136 |
| 4,756,152 | 7/1988 | Krukoski et al. | 60/39.02 |

FOREIGN PATENT DOCUMENTS 736003  8/1955  United Kingdom .............. 60/39.29

*Primary Examiner*—Louis J. Casaregola
*Attorney, Agent, or Firm*—Troxell K. Snyder

[57] ABSTRACT

A method and system for controlling the position of a variable pitch vane stage (34) in a gas turbine engine (10) uses a feedback loop comparing the current compressor pressure ratio to a reference compressor pressure ratio. The reference pressure ratio is determined from a plurality of current engine operating parameters which identify a unique point on the compressor operating line.

4 Claims, 3 Drawing Sheets

METHOD AND SYSTEM FOR CONTROLLING VARIABLE COMPRESSOR GEOMETRY

FIELD OF THE INVENTION

The present invention relates to a method and a system for controlling the position of variable stator vanes and variable bypass bleeds in a gas compressor.

BACKGROUND

Multiple stage gas compressors, for example those used in aircraft gas turbine engines, are frequently operated over a wide range of conditions, such as varying load, rotational speed, input and output pressure, mass flow, etc., which must be accommodated in order to insure efficient and stable operation.

To those skilled in the art of compressor design, the so-called compressor design point is in fact the result of a series of structural, operational, and other design compromises necessary to allow the compressor to function within the expected operating environment. Aircraft gas turbine engines typically present some of the harshest design compromises, with the engine being required to achieve startup, ground idle, flight idle, full takeoff thrust, cruise thrust and a variety of intermediate power output levels as required during aircraft operation. Ambient air pressure and temperature also change as the aircraft climbs from sea level to cruise altitude, and the consequences of even a momentary compressor stall or other operating instability are highly undesirable.

Modern turbofan gas turbine engines typically utilize a two spool compressor configuration wherein a low pressure compressor having a plurality of individual rotor stages partially boosts the incoming air pressure, with a second, multi-stage high compressor providing the remainder of the pressure increase necessary. Such dual compressors, although turning on separate shafts, are closely coupled not only by the fact that the high compressor receives the output compressed air from the upstream low compressor, but also due to the fact that the outlet from the turbine section driving the high compressor shaft is received by a downstream low turbine section which turns the low compressor shaft.

Prior art engines of such two spool design have been built which can function under the range of operating conditions discussed above, although it has been found advantageous under certain conditions to divert or bypass a portion of the compressed air from the compressor section and route it overboard in order to prevent a flow mismatch between the low and high compressors which could induce an undesirable compressor stall condition. Emphasis on high performance and low fuel consumption have also given rise to the variable geometry compressor wherein the plurality of stator stages disposed intermediate the rotor stages of a multi stage compressor are adapted to be repositioned by an external actuation mechanism during operation of the compressor.

The variable stator states in the high or low pressure compressor typically involve an external unison ring and crank linkage secured to each individual vane which causes all the vanes in a single vane stage to be rotated simultaneously about the radial axis, thereby varying the angle of attack of each vane as well as the flow area of the nozzle formed between adjacent vanes for the compressed air flowing therethrough. By judiciously varying the position of the stator vanes and hence the angle of attack and nozzle flow area of each vane stage, it is possible to achieve more efficient compressor operation over a wider range of overall volume flow and without sacrificing a margin of safety between engine operation and the occurrence of a stall condition.

The control and positioning of such variable stator vanes is thus of prime importance in achieving reliable and efficient engine operation. Current prior art control methods schedule the desired position of individual stator vane stages as a function of the rotational speed of the corresponding compressor rotor. These positions are commonly determined at the corresponding steady state operating point and hence require some modification during transient load changes or other varying operating conditions. In general, closing of the stator vane nozzle area increases the safety margin of the overall compressor relative to the occurrence of a stall condition, but simultaneously decreases the overall compressor operating efficiency and airflow rate. Prior art systems, attempting to maintain both a sufficient stall safety margin and compressor efficiency, have required complicated modifying factors to be applied to the steady state vane positioning signal as the engine experiences operating transients.

One effect of these complicating factors on aircraft gas turbine engine operation is to slow the response time to a snap change of throttle position, for example acceleration from flight idle to takeoff thrust or vice versa. In order to ensure that sufficient compressor stall margin is not lost during such extreme transients, prior art fuel controllers either slow the engine and control response time to allow the stator vane controls to more closely track engine performance or displace the operating line downward sacrificing steady state performance for a larger transient margin.

In addition to this undesirable slowing of engine response time, the prior art systems are also subject to reduced functionality due to wear or damage to the linkages positioning the individual vanes. Since the prior art systems are open loop controllers driven by schedules, wear or mechanical backlash in the linkages opening and closing the individual vanes can result in a misalignment of ±2° or more from the desired vane angle of attack. Such misalignment may be global, caused by inaccuracy of the positioning actuator, as well as local caused by backlash in the individual vane positioning cranks, etc. Such inaccuracies may, of course, increase as the linkage is worn and may even force the compressor closer to a stall condition under certain circumstances. Steady state performance must be degraded at design to allow for this anticipated deterioration.

What is required is a vane positioning method and system which monitors compressor performance by a feedback control loop to determine vane position error and to modify the vane positioning signal as necessary to achieve proper collective vane alignment.

SUMMARY OF THE INVENTION

It is therefore an object of the present invention to provide a control system and method for regulating the position of at least one stage of variable position stator vanes in a rotating compressor, or the like.

It is further an object of the present invention to provide a control system and method which is able to accommodate rapid transient changes in the compressor loading.

It is further an object of the present invention to provide a control system and method having a performance monitoring corrective feedback loop for maintaining proper adjustment of the position of the stator vanes and/or a variable flow compressor bypass valve.

According to the present invention, low pressure compressor stator vanes and a variable flow bypass or bleed valve in a rotating compressor are controlled to maintain compressor gas flow and pressure ratio on a preselected operating line. Each point on the operating line corresponds to a plurality of engine operating characteristics, including for example compressor rotor speed, ambient gas pressure, compressor pressure ratio and gas volume flow.

The system and method according to the present invention monitor at least one of these engine operating and performance characteristics and select a current preferred operating point from the plurality of points defined by the compressor operating line. The preferred or reference compressor pressure ratio corresponding to the selected point is compared against a current actual compressor pressure ratio, and the position of the stator vanes and/or bypass valve adjusted as necessary to reduce or increase the vane stage nozzle area or bypass ratio responsive to the difference between the preferred and current pressure ratios.

Unlike prior art stator vane and bypass valve control methods which schedule steady state vane or bypass valve position with respect to rotor speed, the method and system according to the present invention position the stator vanes and bypass valve as required to establish a preferred compressor pressure ratio responsive to currently determined operating characteristics. The advantage is most clearly perceived when compressor transient response is considered. The prior art method of setting vane positions as a function of rotor speed only can lead to inefficient operation or to potential compressor stall conditions, while the method and system according to the present invention manipulates the vane position as well as the compressor bypass valves, if any, to maintain compressor operation along the preselected operating line.

Both these and other objects and advantages of the system and method according to the present invention will be apparent to those skilled in the art upon review of the following specification and the appended claims and drawing figures.

DETAILED DESCRIPTION OF THE PREFERRED EMBODIMENT

Figure 1:
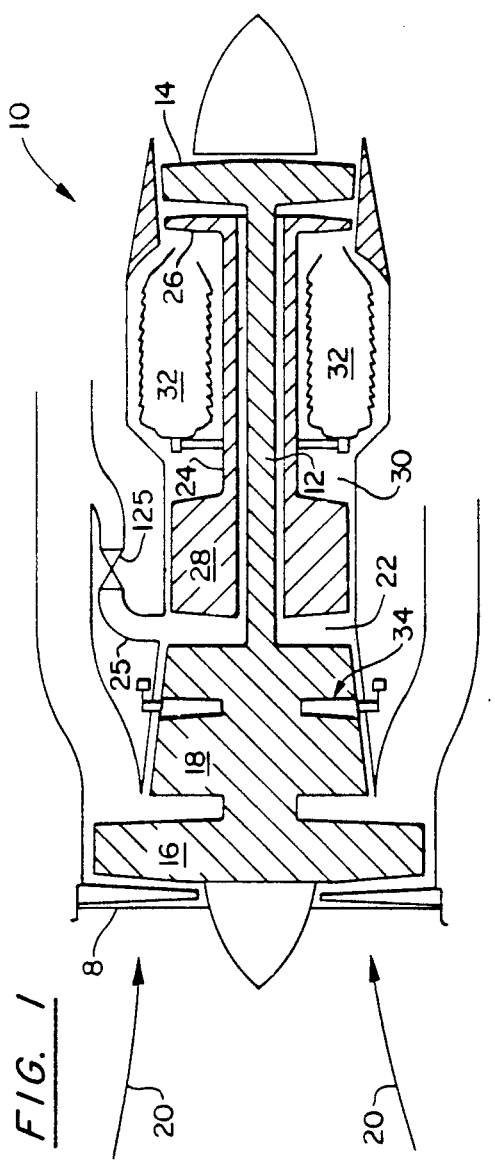
FIG. 1 shows a schematic cross section of a high bypass turobfan gas turbine engine having a variable geometry low pressure axial flow compressor section and a variable flow intercompressor bypass valve.

FIG. 1 shows a gas turbine engine 10 having a first, low speed shaft 12 driven by a low pressure turbine section 14 and having a forward fan 16 driven thereby. The forward fan 16 may equivalently be a gear driven, fixed or variable pitch ducted fan, a variable pitch unducted propeller, or the like. The low speed shaft 12 also drives an axial flow, low pressure compressor section 18 which receives incoming air 20 and exhausts, at the location identified by reference numeral 22, an annular flow of intermediate pressure compressed air. The engine 10 also includes a coaxial, high speed rotor shaft 24 driven by a high pressure turbine section 26 and which in turn drives a high pressure compressor section 28. The high pressure section 28 receives the intermediate pressure compressed air from the exit 22 of the low pressure compressor 18, and discharges a flow of high pressure compressed air at the exit 30 immediately upstream of the engine combustor section 32.

The low compressor section 18 includes a variable geometry portion 34 which operates to alter the flow area of the individual vane stages in the low pressure compressor 18 by changing the angle of attack of the individual vanes in each vane stage. A bypass duct 25 and variable flow bypass or bleed valve 125 are also provided to further reduce the flow of air from the low compressor 18 to the high compressor 28 during periods of low engine power when the low pressure variable geometry portion 34 has reached the lower mechanical or aerodynamic limit. By exhausting a portion of the low compressor outlet, the variable flow bypass duct 25 achieves the same function as the variable low compressor geometry portion 34, although with reduced overall engine efficiency. A similar arrangement (not shown) may be provided for the high compressor section 28. The general arrangement of a bypass turbofan gas turbine engine 10 as shown in FIG. 1, as well as linkages, etc. for providing the variable compressor geometry are well known in the art of gas turbine engine design, as shown for example in U.S. Pat. Nos. 4,279,568 and 4,755,104.

The fan or propeller section 16 may impose certain speed range constraints on the low speed shaft 12, and hence the low compressor 18. It will be apparent to those skilled in the art that engine load changes in an engine configuration having a propeller section 16 operating within a limited speed range will require a variation in the low compressor geometry or bleed valve position in order to vary and/or balance the flow of air through the compressors 18, 28 and turbines 14, 26. Control of the low geometry 34 and/or bleed valve 125 must be accomplished without reliance on the low pressure compressor speed as in the prior art systems discussed in the Background section.

Before proceeding with a discussion of the control system and method according to the present invention, it is necessary to define reference points and quantitites which will be discussed and referred to in detail hereinbelow.

Pressure and temperature are monitored at several points through the engine, identified according to a numbering system wherein:

$PT_2$ represents the total air pressure at the inlet face 8 of the low pressure compressor section 18.

$PT_{2.5}$ represents the total air pressure at the outlet 22 of the low pressure compressor 18 and hence at the inlet of the high pressure compressor section 28.

$PT_3$ represents the total air pressure at the exit 30 of the high pressure compressor section 28. This pressure is also equivalent to the inlet pressure $P_b$ at the burner section 32.

TT shall represent the total temperature at a given station, e.g., $TT_2$, $TT_{2.5}$, $TT_3$.

Total pressure and total temperature as used herein are defined as the stagnation pressure and temperature of the flowing air stream, such as would be measured at the stagnation point on the leading edge of a bluff body, etc.

At all points throughout the specification, the rotational speed of the high speed rotor 24 and the low speed rotor 12 shall respectively be referred to as $NH_{corr}$ and $NL_{corr}$, which represent the corrected rotor speeds. Corrected rotor speed is equivalent to the observed high and low rotor speed, measured in rpm, divided by the square root of the ratio of the absolute total temperature of the air entering the corresponding compressor divided by the ambient air absolute temperature of a standard day, 519R (288K).

Also used herein will be the terms $WL_{corr}$, $WH_{corr}$ which represent the corrected gas weight flow through the corresponding stage of the compressor, calculated by multiplying the actual gas weight flow at the compressor inlet by the square root of the ratio of the total compressor air inlet temperature divided by the standard day temperature with the entire quantity divided by the ratio of total air pressure measured at the corresponding compressor inlet divided by the standard day atmospheric pressure of 29.92 inches Hg (760 mm Hg).

Figure 2:
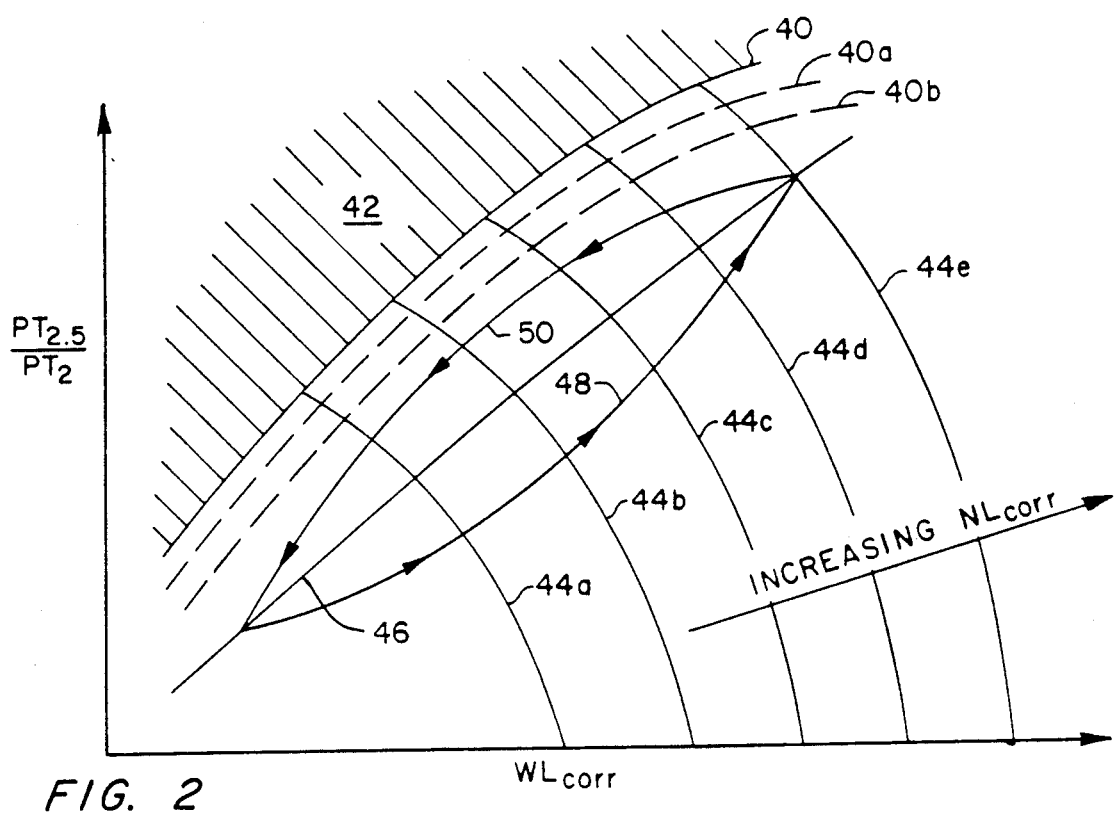
FIG. 2 shows a compressor performance map for a low pressure compressor in a two spool axial flow gas turbine engine.
Figure 3:
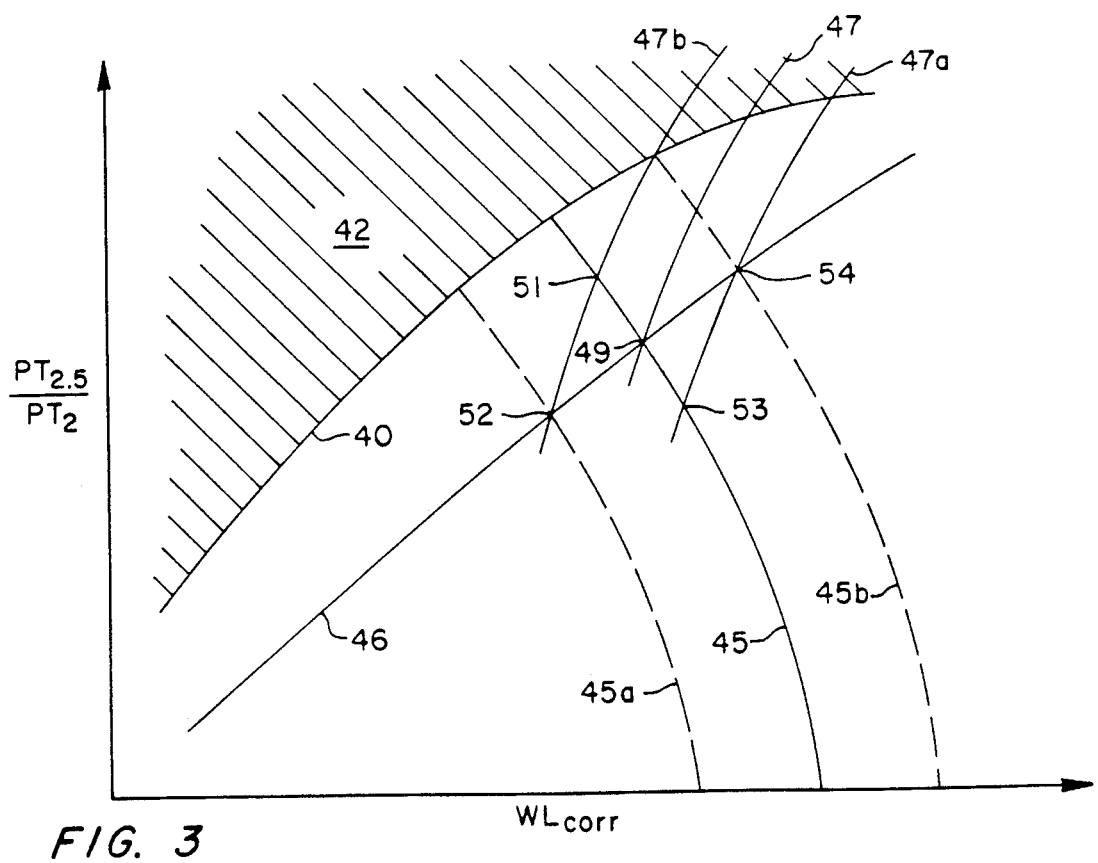
FIG. 3 shows low pressure compressor performance with the control system and method of the present invention.

By consistently referring to the corrected weight flow and rotor speeds, consistent compressor performance maps, such as FIGS. 2 and 3 for the low pressure compressor 18 may be prepared. Such maps are useful not only in predicting compressor performance under various operating conditions, but, in the case of the control system and method according to the present invention, are used to select the desired compressor pressure ratio for the low speed compressor.

FIG. 2 shows a plot of low pressure compressor pressure ratio, $PT_{2.5}/PT_2$ on the vertical axis, and low compressor corrected flow $WL_{corr}$ on the horizontal axis. The uppermost line 40 defines the lower limit of the surge zone 42 wherein stalling of individual blades or even entire stages of blades can occur. Hence it is essential that the low pressure compressor always operate in the zone beneath the surge line by at least a suitable safety margin. The curving lines 44a, b, c, d, e represent lines of constant corrected low rotor speed $NL_{corr}$ with the corrected low rotor speed increasing between 44a and 44e.

Line 46 represents the preselected operating line for the low pressure compressor, which comprises a plurality of preferred operating points over a range of desired corrected mass flow. The operating line is selected by considering not only the surge safety margin between each point and the surge line 40, but also by considering engine operating efficiency (not shown on this map). Engine operating efficiency is a function of a broad collection of variables, but it is sufficient to note herein that operating efficiency generally diminishes as the engine operates beneath the operating line 46. Thus, the operating line 46 is seen as a balance between diminishing the surge safety margin with respect to the surge line 40 and operating the low pressure compressor in a zone of reduced efficiency.

It should further be noted that the lines 40, 46 shown in FIG. 2 have been determined at sea level, and generally shift as the compressor and/or aircraft engine is operated at higher altitude. These shifts are generally in the direction of lowering the surge line 40 as ambient pressure decreases 40a, 40b.

Also shown in FIG. 2 is the path taken by a low pressure compressor controlled by a prior art stator vane positioning controller during acceleration 48 and deceleration 50. As can be seen, for the low pressure compressor, the acceleration line 48 dips generally below the preferred operating line 46 as the mass flow through the compressor is increased, and rises above the preferred operating line 46 as mass flow is reduced and the compressor performance moves along the deceleration path 50. During steady state operation at a particular rotor speed, the compressor operates on the preferred operating line 46.

The excursions of the acceleration and deceleration lines 48, 50 relative to the preferred operating line 46 are the result of the occurrence of a transient mismatch between the air flow requirements of the high pressure compressor 28 and the speed-flow characteristics of the low pressure compressor 18. The prior art geometry control system, using low rotor $NL_{corr}$ speed as the primary control input, is not suited for controlling the vane angle and bypass valve flow rate during transient operation. Low compressor performance thus deviates from the desired operating line 46 in FIG. 2.

FIG. 3 shows the operating characteristics of a low pressure compressor 18 as in FIG. 2, which will be used to illustrate the operation of the system and method according to the present invention. FIG. 3 is a graph of low compressor pressure ratio $PT_{2.5}/PT_2$ on the vertical axis and corrected low rotor mass flow $WL_{corr}$ ($W\sqrt{\theta_{t2}}/\delta_{t2}$). Also shown are the surge lines 40, surge zone 42, the desired operating line 46 and a series of constant speed curves 45, 45a, 45b which represent the variation of corrected low compressor flow $WL_{corr}$ with low pressure compressor ratio $PT_{2.5}/PT_2$ at a particular rotor speed. Curve 45 represents compressor performance with the variable stator vanes at their steady state position, 45a with the vanes closed incrementally, and 45b with the vanes opened incrementally with respect to the steady state position 45.

The flow requirements of the downstream high pressure compressor 28 are shown by curves 47, 47a, 47b wherein 47 represents the steady state, 47a represents an accelerating or load increasing transient, and 47b represents a decelerating or load shedding transient. Thus, an acceleration of a gas turbine engine 10 from a steady state operating point 49 would result, without correct positioning of the stator vanes, in an excursion along the constant low rotor speed line 45 to point 53. Conversely, an uncorrected deceleration would drive the engine operating point toward 51 and the surge line 40.

The control system and method avoids the occurrence of such transients by monitoring engine performance and manipulating the compressor variable vanes 38 and/or bypass valve 125 to maintain the current engine operating point on the desired line of operating points 46. The effect of such control for a transient acceleration would be the opening of the low compressor stator vanes 36 during the transient plane, shifting the constant speed line to 45b to meet the high compressor acceleration flow line 47a at point 54 on the desired operating line 46. Likewise, a deceleration, if properly controlled by closing the low pressure compressor vanes 36, would result in the meeting of the high pressure compressor required flow curve 47b and the low pressure compressor constant speed curve 45a at the point 52 also on the operating line 46.

Such control of compressor geometry is achieved by the method and system of the present invention by monitoring certain current engine operating parameters, specifically $PT_2$, $PT_{2.5}$, and $PT_3$, calculating a desired reference value based on the monitored parameters, and modifying the compressor geometry to eliminate the error between the monitored parameters and the reference value. For a variable geometry low compressor, the parameters monitored overall compressor pressure ratio $PT_3/PT_2$ and low pressure compressor ratio $PT_{2.5}/PT_2$. The method according to the present invention determines a reference value of $PT_{2.5}/PT_2$ responsive to the actual current overall compressor pressure ratio $PT_3/PT_2$, which is used by the method and system of the present invention as the control point for manipulating the compressor geometry as described below.

Before discussing the system in detail, the development of the relationship between overall compressor pressure ratio $PT_3/PT_2$ and desired low compressor pressure ratio will be disclosed.

The flow of engine working fluid at the entrance to the high pressure turbine 26 is normally in the hypersonic flow regime thus resulting in "choked flow". Choked flow is characterized by the equation $$\frac{W_4 \sqrt{TT_4}}{PT_4 A} = K_1 \qquad \text{(Eq. 1)}$$

wherein $W_4$ = mass flow of working fluid in pounds/sec
$TT_4$ = working fluid total temperature
$PT_4$ = working fluid total pressure
$A$ = turbine inlet flow area
$K_1$ = constant As will be appreciated by those skilled in the art of gas turbine engine and compressible gas flow, the following approximations may be used to simplify the relationship:

$W_4 \sim W_3$ the mass flow of working fluid at the combustor exit is approximately equal to the flow of air in the high pressure compressor, the mass of the combusted fuel being negligible by comparison.

$PT_4 \sim PT_3$ i.e., the turbine inlet pressure is always close to the high compressor outlet pressure, pressure drop through the burner section 32 being negligible.

Rearranging and multiplying by $PT_2/PT_2$ $$\frac{W_3 \sqrt{TT_4}/PT_2/14.7}{PT_3/(PT_2)} = K_1 A = K_2 \qquad \text{(Eq. 2)}$$

Figure 4A:
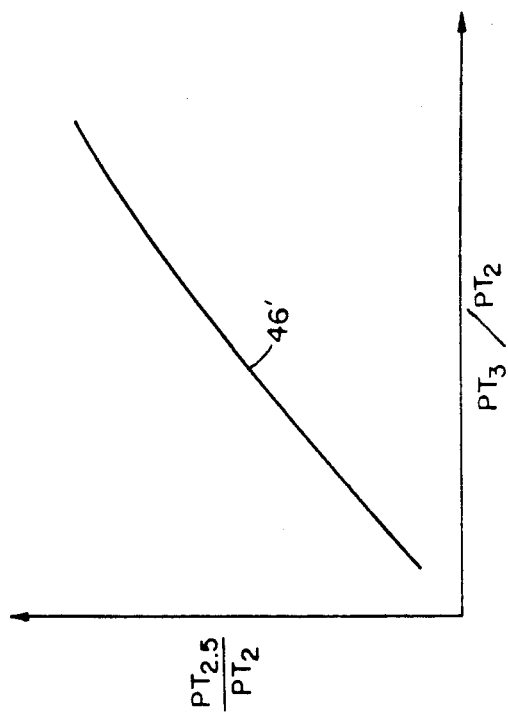
FIG. 4A shows the relationship between the desired low pressure compressor pressure ratio and the overall compressor pressure ratio.

$K_2$ being a combined constant.
Referring now to FIGS. 2 and 3, $$WL_{corr} = \frac{W_2 \sqrt{\theta_2}}{\delta_{t2}} \qquad \text{(Eq. 3)}$$

and comparing a simplified Eq. 2:

$$\frac{W_3 \sqrt{TT_4}/\delta_{t2}}{PT_3/PT_2} = K_2 \qquad \text{(Eq. 2a)}$$

and recognizing that $TT_4$ at steady state is a well behaved function of $PT_3$, it is possible to approximate the low pressure compressor ratio of the operating line 46 as a function of $PT_3/PT_2$, only. Hence, FIG. 4A shows the functional relationship 46' between $PT_{2.5}/PT_2$ and $PT_3/PT_2$ along the steady state operating line 46 of FIGS. 1 and 2.

The system and method of the present invention use this close approximation of desired low compressor pressure ratio as a reference value $PT_{2.5}/PT_{2ref}$ for controlling low compressor vane angle and/or bleed valve flow, thus holding low pressure compressor ratio along the operating line 46 during transient operation. The benefits of avoiding the transient excursion of FIG. 1 should immediately be obvious. First, the transient acceleration may be accomplished more quickly, without the clamping or other restraints used by prior art systems to avoid entering the surge zone 42. Second, and most important, the operating line 46 can be defined much more closely to the surge line 40 without risking the occurrence of an undesirable surge or stall condition. Overall engine operation is thus improved with regard to both efficiency and power output.

Prior art compressor geometry control systems utilizing only rotor corrected speed to position the stator vanes are unable to respond quickly enough to open the nozzle vane area and hence restore the surge safety margin. These prior art systems often use various predicting control functions to anticipate transient occurrences and speed up stator vane response, however the effectiveness of such anticipatory action is limited by the countering requirement for control system stability. Thus, various methods for reducing the rate of change of engine fuel flow and hence slowing the response of the engine and compressors to rapid movement of the engine throttle are provided to stabilize engine operation and avoid approaching the surge line 40, 40'.

As noted generally above, closing the nozzle area defined between the stator vanes in a variable stator vane stage increases the safety margin between the low pressure compressor 18 and the surge line 40, and allows faster deceleration of the high pressure compressor. Likewise, increasing the nozzle vane area will raise the engine pressure ratio and airflow at a given low rotor corrected speed, allowing faster acceleration of the high pressure compressor.

The system and method according to the present invention also provides for the control of intercompressor and other bleed valves as may be required to maintain engine stall margin during periods of operation at low thrust levels wherein the variable stator vane stages have been closed to the extent possible. Such bleeds function by diverting a portion of the compressor air flow overboard and hence reducing the overall compressor pressure ratio. Such bleeds are required as it becomes mechanically impractical to close the variable stator vanes and hence nozzle flow area below a certain minimum.

Figure 5:
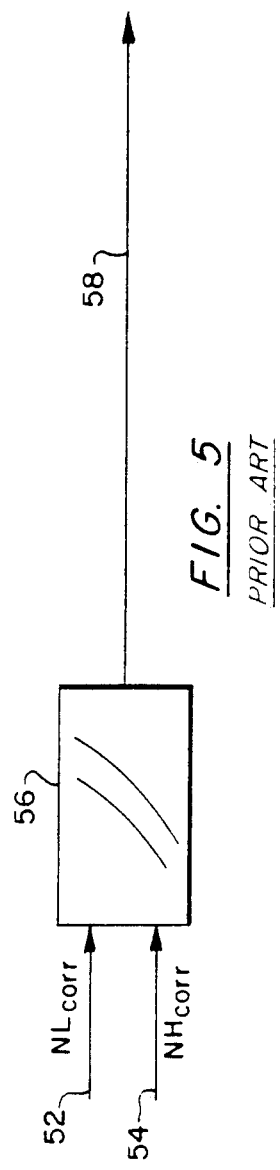
FIG. 5 shows a prior art vane positioning control system.

FIG. 5 shows a prior art vane control system which is essentially an open loop, proportional controller wherein a first signal 52 representative of the corrected low rotor speed and a second signal 54 representative of the high rotor corrected speed are compared against a predetermined schedule 56. Based upon the input values 52, 54 the schedule 56 generates a vane position signal 58 which is directed to the vane actuator and linkage (not shown) which positions the vane stage or stages. As noted above, such open loop systems are able to accurately position stator vanes only to the extent that the schedule 56 represents the current optimum position and only to the extent that the actuator and linkage arrangement (not shown) is mechanically and aerodynamically able to achieve the position represented by the position signal 58.

Figure 4:
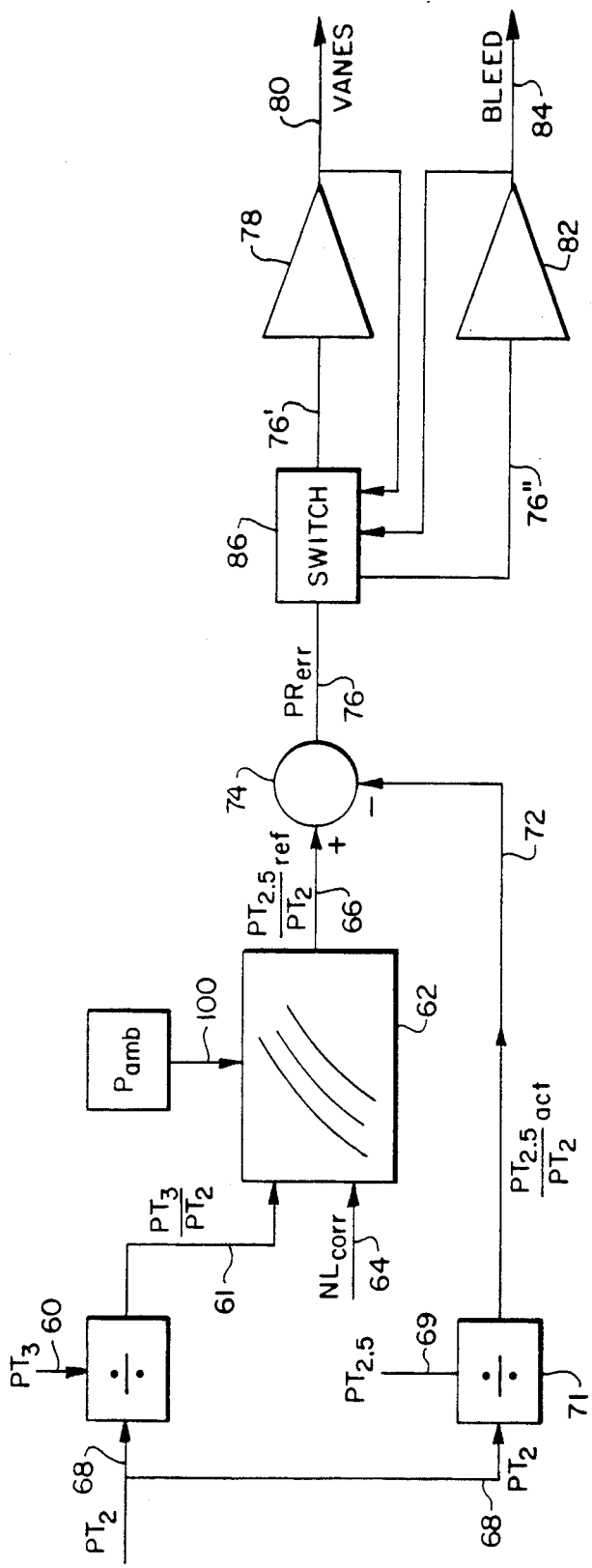
FIG. 4 shows a schematic of a control system according to the present invention.

FIG. 4 shows the system according to the present invention which includes a feedback control loop for modulating the vane position signal to achieve accurate collective positioning, regardless of shortcomings in the mechanical linkage, as well as to achieve compressor operation on the operating line during transient or other non steady state operating conditions.

According to the present invention, the system and method monitor the low compressor inlet pressure $PT_2$ 68, low compressor outlet pressure $PT_{2.5}$ 69, and high compressor outlet pressure 60 at points 8, 22, and 30 in the engine 10 of FIG. 1. Overall compressor pressure ratio $PT_3/PT_2$ represented by signal 61 in FIG. 4 provides an input to the operating line schedule 62 along with the corrected low rotor speed $NL_{corr}$ 64. The curves in the schedule block 62 are essentially similar to the operating line curve in FIG. 3, with the schedule block 62 producing an output signal 66 representative of the preferred low pressure compressor pressure ratio $PT_{2.5}/PT_{2ref}$ which corresponds to the point on the operating line 46 at the current overall compressor pressure ratio and rotor speed. An altitude correction signal 100 may be used optionally by the schedule block 62, or separately by a gain block (not shown) to match the output signal, $PT_{2.5}/PT_{ref}$ 66, to the current engine operating altitude.

Low compressor outlet pressure $PT_{2.5}$ 69 is combined with the inlet pressure signal 68 by divisor block 71 to produce a signal 72 representative of the current low compressor pressure ratio $PT_{2.5}/PT_{2act}$. The difference between $PT_{2.5}/PT_{2ref}$ 66 and $PT_{2.5}/PT_{2act}$ 72 is determined by the summing block 74 and is represented by an error signal $PR_{err}$ 76. The error signal 76 represents the difference between the actual measured low compressor pressure ratio and the optimum low compressor pressure ratio as determined from the compressor operating line 46 in FIG. 2.

This error signal 76, 76' is routed to an integral controller 78 which establishes a vane position signal 80 which in turn drives the vane actuation and linkage system (not shown). It will be appreciated by those skilled in the art of feedback control that the vane position signal 80 changes only in response to the existence of an error signal $PR_{err}$ 76, 76' which in turn exists only when the actual compressor pressure ratio is different from the reference compressor pressure ratio.

Bypass flow control may be accomplished by a plurality of methods, one of which is illustrated in FIG. 4 as a signal diverting switch 86 for routing the pressure ratio error signal $PR_{err}$ 76, 76', 76" between the vane position integral controller 78 and a bleed position integral controller 82. As the system according to the present invention becomes unable to reduce actual low compressor pressure ratio $PT_{2.5}/PT_{2act}$ to match the reference compressor pressure ratio 66 by further closing the vane stages, the switch 86 diverts the signal 76" to the bleed integral controller 82 modifying the bleed position signal 84. The bleed valve 125 (not shown) is opened responsive to the bleed position signal 84, diverting a portion of the compressor airflow overboard thereby diminishing actual low compressor pressure ratio $PT_{2.5}/PT_2$ by the required amount. It should be noted that the bypass means 25 is used only at lower power levels and only when low compressor pressure ratio control cannot be achieved by manipulation of the stator vanes 34 as the diversion of compressor air overboard results in a significant efficiency penalty.

One other feature of the dual pressure ratio control of vanes and bleeds according to the present invention is provided should one or the other of the actuation systems experience a limit or failure. For example, should the vane actuator fail leaving the vanes in an intermediate position, the switch 86 in the system according to the present invention would detect the inability of the vane controller 78 to reduce the actual pressure ratio 72, and thus direct the error signal 76" to the bleed controller 82 for achieving the necessary pressure ratio reduction via the compressor bleed system. Alternatively, should the bleed actuator become inoperable in an opened position, the system and method according to to the present invention can accommodate such diversion of air by directing the error signal 76' to the vane integral controller 78, modifying the vane position signal 80 so as to open the stator vanes 36 to maintain the low compressor pressure ratio and hence mass flow.

The basic differences between the prior art open loop control system of FIG. 5 and the system and method according to the present invention as shown in FIG. 4 are now apparent. Unlike the system in FIG. 5 wherein certain engine operating characteristics 52, 54 are compared to a predetermined schedule 56 for generating an engine control signal 58, the system and method according to the present invention monitor compressor operating characteristics 60, 68, 69 and compare said characteristics against a predetermined schedule 62 of compressor performance, and generate a modifying error signal 76 responsive to any difference between current actual compressor performance and the preferred or reference compressor performance 66.

The absolute position of the variable stator vanes 36 is thus not determined by the system and method according to the present invention but changed as necessary to achieve optimum compressor performance as determined in advance from a balance of efficiency, reliability, and operability factors. The system and method according to the present invention are therefore also better able to handle transient operating conditions as the stator vane signal 80 is continually modified so as to keep the low compressor pressure ratio at the optimum as determined from the operating line 46 regardless of variations in pressure at the compressor outlet, $PT_3$, which may be induced by the downstream effects of the combustion chamber 32.

As the likelihood of compressor stall increases during engine transient operation, and in particular to snap movements of the engine throttle, the system and method according to the present invention provides a significant improvement in engine transient response time without decreasing, and in fact most likely improving, the compressor stall safety margin throughout the transient engine response. As the low compressor flow is now constantly corrected to this operating line by the system according to the present invention, the desired operating line may be selected using a reduced margin with respect to the stall line 40.

One final application which may best illustrate the functionality of the system and method of the present invention as compared to the prior art control system may be best appreciated by considering a state of the art propfan aircraft propulsion system wherein the low compressor shaft 12 drives a large, unducted propulsor via a gearbox arrangement. Such large propulsors, having variable pitch blades, typically operate in a limited range of rotational speed, often at a single, preferred speed throughout the normal cruise and takeoff power range. Overall propulsor thrust is achieved by varying the pitch of the individual propulsor blades, thus requiring the low pressure compressor 18 to operate at a variety of power levels without significant change in the compressor speed $NL_{corr}$.

Clearly, the prior art control method as shown in FIG. 5 is inadequate to control variable geometry components in a constant speed compressor having variable loading, while the method and system according to the present invention can accommodate such operation Without modification. In this example, the compressor performance moves along a line of constant rotor speed, with reference low compressor pressure ratio varying in response to the air mass flow through the compressor.

Due to a variety of mechanical and fluid dynamic factors, it has been determined, as shown in FIG. 4A, that the pressure ratio $PT_{2.5}/PT_2$ of the low pressure compressor 18 in a propfan gas turbine engine having a constant speed low rotor is an essentially linear function of the overall compressor pressure ratio, $PT_3/PT_2$. Modification of the schedule 62 and its data inputs so as to generate the low pressure compressor reference signal 66 based on overall compressor pressure ratio $PT_3/PT_2$ may be used to even further simplify the control system for this particular application.

It should thus be apparent that the control system and method according to the present invention is well suited to achieve the objects and advantages as set forth hereinabove. Further, although the system of FIG. 4 is represented schematically by traditionally analog symbols, it must be noted that such symbols apply equally to digital systems and that in fact the preferred embodiment of the present invention involves digitized signals representative of the engine operating characteristics which are functionally combined as shown and discussed herein. Thus, the system and method according to the present invention are not intended to be limited by the illustrative discussion and representations which appear hereinabove, but only by the scope of the following claims.

I claim:

1. A method for controlling the position of a variable area stator vane stage in a gas turbine engine having a first, low pressure compressor disposed upstream of a second, high pressure compressor, said first compressor having a compressor inlet for receiving a flow of gas to be compressed, the second compressor including a compressor outlet for exhausting the compressed gas, and said first and second compressors each further including a rotor having at least one stage of rotating blades, comprising the steps of:

a) measuring the total gas pressure at the compressor inlet;
b) measuring the total gas pressure at the compressor outlet;
c) determining, responsive to the measured inlet and outlet gas pressures, the current pressure ratio for the compressor;
d) determining, responsive to at least one of a plurality of current engine operating characteristics, including the overall compressor pressure ratio of the first and second compressors, a desired compressor pressure ratio including the steps of:
  determining, in advance, a series of preferred engine operating points, each preferred point, having a corresponding value of each engine operating characteristic and compressor pressure ratio,
  determining the current value of each engine operating characteristic,
  identifying a preferred engine operating point responsive to the determined current characteristic, said preferred point being selected from among the series of preferred points, and setting the desired compressor pressure ratio equal to the compressor pressure ratio corresponding to the preferred engine operating point;
e) comparing the current pressure ratio to the desired pressure ratio; and
f) causing the position of the stator vane stage to be varied responsive to the comparing step for minimizing the different between the current and desired pressure ratios.

2. The control method as recited in claim 1, wherein the plurality of engine operating characteristics includes
 ambient air pressure, and
 compressor rotor speed corrected to standard conditions.

3. The control method as recited in claim 1, wherein the rotor of the first compressor drives an external propeller having a plurality of variable pitch blades, said propeller and rotor operating, at least over a portion of the operating range, at substantially constant corrected angular speed.

4. A method for controlling the position of a variable area stator vane stage in a gas turbine engine, said engine having a compressor inlet for receiving a flow of gas to be compressed, a compressor outlet for exhausting the compressed gas, wherein the compressor further includes at least one variable flow bleed path for diverting overboard a portion of the gas flow through the compressor, and a rotor having at least one stage of rotating blades, comprising the steps of:
 measuring the total gas pressure at the compressor inlet;
 measuring the total gas pressure at the compressor outlet;
 determining, responsive to the measured inlet and outlet gas pressures, the current pressure ratio for the compressor; comparing the current gas pressure ratio to the desired pressure ratio;
 causing the position of the stator vane stage to be varied responsive to the comparing step for minimizing the difference between the current and desired pressure ratios;
 determining the position of the variable stator vanes within a range of possible positions, and
 opening a bleed valve disposed in the bleed path to maintain the current compressor pressure ratio equivalent to the desired compressor pressure ratio when the variable stator vanes are positioned at a minimum position within the range of possible positions.

* * * * *